United States Patent
Lerchenmueller et al.

(10) Patent No.: US 12,529,579 B2
(45) Date of Patent: Jan. 20, 2026

(54) INDUCTIVE LINEAR DISPLACEMENT SENSOR ARRANGEMENT FOR A VEHICLE

(71) Applicant: Robert Bosch GmbH, Stuttgart (DE)

(72) Inventors: Klaus Lerchenmueller, Rettenberg (DE); Lothar Detels, Burgberg (DE)

(73) Assignee: Robert Bosch GmbH, Stuttgart (DE)

( * ) Notice: Subject to any disclaimer, the term of this patent is extended or adjusted under 35 U.S.C. 154(b) by 253 days.

(21) Appl. No.: 18/350,478

(22) Filed: Jul. 11, 2023

(65) Prior Publication Data
US 2024/0077336 A1   Mar. 7, 2024

(30) Foreign Application Priority Data
Sep. 7, 2022 (DE) .................... 10 2022 209 299.6

(51) Int. Cl.
G01D 5/20 (2006.01)

(52) U.S. Cl.
CPC ....... G01D 5/2053 (2013.01); *G01D 2205/18* (2021.05)

(58) Field of Classification Search
CPC .. G01D 5/2053; G01D 5/2291; G01D 5/2451; G01D 5/34746; G01D 5/34753; G01D 11/245; G01D 11/30; G01B 7/003; G01B 7/008; F16C 29/005
See application file for complete search history.

(56) References Cited

U.S. PATENT DOCUMENTS

| | | | | |
|---|---|---|---|---|
| 3,068,457 A * | 12/1962 | Nevius | ..................... | G01D 5/22 333/140 |
| 3,596,222 A * | 7/1971 | Pagella | ................ | G01D 5/2073 336/123 |
| 3,897,119 A * | 7/1975 | McMurtrie | ........... | F16C 29/041 384/55 |
| 4,923,311 A * | 5/1990 | Gibbs | ................... | F16C 29/005 384/57 |
| 5,106,206 A * | 4/1992 | Tanaka | ................ | F16C 29/0602 384/45 |

(Continued)

FOREIGN PATENT DOCUMENTS

DE   60 2004 006 168 T2   1/2008
DE   10 2015 206 500 A1   11/2015

*Primary Examiner* — Steven L Yeninas
(74) *Attorney, Agent, or Firm* — Maginot, Moore & Beck LLP (57) ABSTRACT

An inductive linear displacement sensor arrangement includes a movable coupling device coupled to a movable body, an electrically conductive coupling element, and a stationary circuit carrier. The circuit carrier includes an excitation structure and a receiving structure, which extend along a displacement path of the coupling device. An evaluation and control unit is designed to evaluate a measurement signal induced in the receiving structure and to determine the current position of the coupling device and of the body. The coupling device comprises a slider on which the electrically conductive coupling element is arranged. The slider is mounted for sliding movement in a plane of displacement via the path of displacement of the coupling device on two parallel guide elements, one of which guides the slider of the coupling device along the displacement path, and another of which is a sliding guide which prevents the slider from tilting and/or twisting.

11 Claims, 5 Drawing Sheets

(56) References Cited

U.S. PATENT DOCUMENTS

| | | | | |
|---|---|---|---|---|
| 5,434,602 | A * | 7/1995 | Kaburagi | B41J 19/305 |
| | | | | 33/708 |
| 5,588,757 | A * | 12/1996 | Unosawa | G01D 15/24 |
| | | | | 400/279 |
| 2007/0002488 | A1 * | 1/2007 | Kato | G01D 5/34746 |
| | | | | 360/85 |
| 2018/0066706 | A1 * | 3/2018 | Yen | F16C 33/205 |
| 2020/0271480 | A1 * | 8/2020 | Shaga | G01D 5/2073 |
| 2023/0152075 | A1 * | 5/2023 | Pichler | G01L 5/221 |
| | | | | 324/207.21 |
| 2023/0221149 | A1 * | 7/2023 | Janisch | G01D 5/2066 |
| | | | | 324/207.15 |

* cited by examiner

INDUCTIVE LINEAR DISPLACEMENT SENSOR ARRANGEMENT FOR A VEHICLE

This application claims priority under 35 U.S.C. § 119 to application no. DE 10 2022 209 299.6, filed on Sep. 7, 2022 in Germany, the disclosure of which is incorporated herein by reference in its entirety.

The disclosure relates to an inductive linear displacement sensor arrangement for a vehicle.

BACKGROUND

Braking systems for vehicles which are equipped with a pedal displacement sensor for detecting the brake pedal position are known from the prior art. Magnetic or inductive displacement sensors can, e.g., be used for this purpose. In the case of an inductive sensor, in addition to an evaluation and control unit, the predominant part of the printed circuit board having at least one excitation structure and at least one receiving structure is fundamentally relevant to the function. At least one coupling device positioned at a defined distance relative to the at least one excitation structure and the at least one receiving structure and having at least one electrically conductive coupling element enables precise position determination of the at least one coupling device or a corresponding movable body via the eddy current effect. Given requirements for increased accuracy, the influence of the air gap or the distance between the at least one coupling device and the at least one excitation structure and the at least one receiving structure is dominant. Known solutions for linear guiding and positioning of the coupling device on the printed circuit board with the at least one excitation structure and the at least one receiving structure are usually made of a combination of a cylindrical guide rod and a support structure in plastic. Given the material pairing and the tolerances, there may be disadvantages in positioning and repeat accuracy over the requirement range.

Known from DE 10 2015 206 500 A1 is an inductive displacement sensor comprising a coil system with a planar primary coil for generating a magnetic field and two planar secondary coils arranged within the primary coil for sensing a position of a target, which is movable along the secondary coils. The secondary coils each comprise one crossover. In the present case, the two identical secondary coils are spatially separated from each other, with the crossover of each secondary coil aligned parallel to the direction of displacement of the target.

Known from DE 60 2004 006 168 T2 is an inductive position sensor comprising at least one planar substrate, on which a transmitting antenna and a receiving antenna are formed, and an intermediate coupling element designed to be moved relative to the at least one planar substrate along a measuring direction transverse to the planar substrate. According to the position of the intermediate coupling element along the measurement direction, the electromagnetic coupling between the transmitting antenna and the receiving antenna varies, wherein at least one of the transmitting antenna and the receiving antenna comprises a first coil about a first axis and a second coil about a second axis that is transverse to the first axis.

SUMMARY

The inductive linear displacement sensor arrangement for a vehicle having the features of the disclosure has the advantage that its constructive design enables an accurate and constant air gap between at least one coupling device and at least one receiving structure arranged on a stationary circuit carrier over the service life of the inductive linear displacement sensor arrangement. Embodiments of the inductive linear displacement sensor arrangement according to the disclosure can preferably be used as a pedal displacement sensor of a brake pedal in order to determine the current position of the brake pedal. As a result, embodiments of the inductive linear displacement sensor arrangement according to the disclosure can improve both performance for precise control and comfort in corresponding novel braking systems. Over the lifetime of a vehicle, several million braking operations can easily be initiated by the driver. In this specific case, the moving parts, i.e., the moving parts of the inductive linear displacement sensor arrangement acting as a pedal displacement sensor, are robustly designed.

Embodiments of the present disclosure provide an inductive linear displacement sensor arrangement for a vehicle, having at least one movable coupling device coupled to a movable body and comprising at least one electrically conductive coupling element, and a stationary circuit carrier. The circuit carrier comprises at least one excitation structure and at least one receiving structure extending along a path of displacement of the at least one coupling device. An evaluation and control unit is designed to evaluate at least one measurement signal induced in the at least one receiving structure and to determine the current position of the at least one coupling device and the movable body. The at least one movable coupling device comprises a slider on which the at least one electrically conductive coupling element is arranged. In this case, the slider is mounted and can be slid over the displacement path of the at least one coupling device on two parallel guide elements in a plane of displacement which extends parallel to the at least one receiving structure of the circuit carrier at a predeterminable constant distance. One of the two guide elements guides the slider of the at least one coupling device along the displacement path free from backlash, and another of the two guide elements is used as a sliding guide and prevents the slider of the at least one coupling device from tilting and/or twisting.

In embodiments of the disclosure, the slider of the at least one coupling device can move freely and almost free of force on the two guide elements over the entire displacement path. In addition, the slider can in turn be coupled to the moving body free from backlash. In addition, the glider can be precisely guided in the plane of displacement. A key design feature is the use of two guide elements for the slider of the at least one coupling device, so that the slider can be stabilized transversely to the direction of displacement. Doing so enables the displacement of the at least one coupling element, which is mounted on the slider, to be only one-dimensional, since all other directions of displacement, which can be caused by, e.g., tilting, twisting, backlash, etc., can be minimized by the guide and the opposing support of the slider. The slider is therefore on the one hand used for precise linear guidance and positioning of the at least one coupling device on the guide elements and, on the other hand, for mechanically precise and stable accommodation of the at least one electrically conductive coupling element of the at least one coupling device, which faces the at least one receiving structure of the circuit carrier. Based on a periodic alternating signal coupled into the at least one excitation structure and the eddy current effects caused by the at least one electrically conductive coupling element of the at least one coupling device and the resulting signals induced into the at least one receiving structure, a precise detection or evaluation of the position of the at least one coupling device can be ensured.

The term "evaluation and control unit" can in this context be understood to mean an electrical assembly or electrical circuit that processes or evaluates the detected sensor signals. Preferably, the evaluation and control unit can be designed as an ASIC module (ASIC: application-specific integrated circuit). The evaluation and control unit can comprise at least one interface, which can be designed in terms of hardware and/or software. In a hardware-based design, the interfaces can, e.g., be part of the ASIC device. However, it is also possible that the interfaces be separate integrated circuits, or consist at least in part of discrete components. In a software-based design, the interfaces can, e.g., be software modules provided on a microcontroller alongside other software modules.

Advantageous improvements to the inductive linear displacement sensor arrangement for a vehicle disclosed in the disclosure are made possible by the measures and embodiments specified in the disclosure.

It is particularly advantageous that the two guide elements can each be designed as cylindrical guide pins. Such a cylindrically shaped guide pin can be manufactured cost-effectively with low tolerances and high surface quality. For example, alloyed steels, stainless steels and non-ferrous metals can be used as materials. The cylindrical guide pins can be manufactured to be "smooth" or having a low surface roughness to a high degree of precision and enable precise guidance over the entire path of displacement of the coupling device.

In one advantageous embodiment of the inductive linear displacement sensor arrangement, the guide elements can be mounted in parallel in a plastic frame which can define the path of displacement of the at least one coupling device and support the circuit carrier. The guide elements can be inserted into the plastic frame. In this case, the positional accuracy is within the range of the molding tolerances of the frame, which is designed as a plastic injection-molded part. The frame is also used to hold the circuit carrier. Since the frame can be injection molded from a single part, there are low tool-related tolerances. The frame can have tool-bound mechanical tolerances in the range from 0.05 to 0.1 mm. Precise positioning of the moving slider in relation to the stationary circuit carrier is enabled as a result. The tolerance-minimized design has the advantage that a constant distance between the at least one electrically conductive coupling element and the at least one receiving structure of the circuit carrier results over the entire path of displacement. The resulting air gap is also very precise and constant with small tolerances over the entire displacement path due to this design. Doing so enables a reduction in the nominal air gap and thus an improvement in the signal amplitude of the signal induced in the at least one receiving structure.

In a further advantageous embodiment of the inductive linear displacement sensor arrangement, the slider of the at least one coupling device can be designed as an injection-molded plastic component with two guide devices, which can form sliding zones for the guide elements. Doing so enables cost-effective production of the slider with low tolerances, which can be manufactured as a tool-bound geometry. To reduce the overall length, the slider of the at least one coupling device can have an L-shaped design. Doing so enables compact "nesting" of multiple sliders on the guide elements.

In a further advantageous embodiment of the inductive linear displacement sensor arrangement, a first guide device of the slider can be designed as a guide opening through which one of the two guide elements runs free from backlash. In addition, a second guide device of the slider can be designed as a guide fork through which another of the two guide elements runs. This design has the advantage that guidance with a reduced running clearance can be produced via the corresponding guide element and the associated first guide device designed as a guide opening in the slider. The other guide element engages on the slider via the second guide device, which is designed as a guide fork. The guide fork can comprise two plane-parallel surfaces to provide anti-tip and/or anti-rotation protection. In addition, the guide fork can be used as a tolerance compensator and, e.g., compensate for a distance tolerance of the two guide elements fixed in the frame. The slider is assembled by "threading" it onto the guide elements in the frame and then pushing it in completely. The material pairing between the fixed guide elements and the slider of the at least one coupling device can be designed such that, given a small running clearance, which for example has a value of less than 0.05 mm, on the one hand only the smallest forces are required to move the slider, and on the other hand wear between the guide elements and the slider is also minimized. For example, POM polymer (POM: PolyOxyMethylene) or PEEK polymer (PEEK: (Polyetheretherketone) can be used as a material pair in combination with alloyed steels or stainless steels, which have a high surface quality due to grinding or polishing. To increase robustness, the guide devices can comprise guide sleeves pressed into the sliders, which are, e.g. designed as bushings made of non-ferrous metal or metallic bushings with a PTFE running layer, etc.

In a further advantageous embodiment of the inductive linear displacement sensor arrangement, the slider of the at least one coupling device can be coupled to the movable body by at least one driver. The at least one driver can provide a tolerance-free connection of the slider of the at least one coupling device to the moving body, such as a pedal rod of the brake pedal as a moving mechanical encoder system. The at least one driver can, e.g., be injection-molded from plastic or also implemented metallically in the form of an easily mounted clamp. To achieve high repeatability and reliability over the life of the system, a metallic design, for example in the form of a spring-elastic clamp ("beak"), is advantageous. The assembly and the backlash-free coupling between the moving body in this embodiment is comparable to a plug-in connection in electrical plug-in systems.

In another advantageous embodiment of the inductive linear displacement sensor arrangement, the at least one excitation structure can be coupled to at least one oscillator circuit that couples a periodic alternating signal to the at least one excitation structure during operation. In this case, the at least one movable coupling device can influence an inductive coupling between the at least one excitation structure and the at least one receiving structure depending on its current position. The at least one excitation structure can comprise at least one excitation coil, which can extend circumferentially along the edge of the at least one circuit carrier. The at least one receiving structure can comprise at least one receiving coil. The at least one receiving coil can feature a periodically repeating loop structure, which can be distributed over multiple layers of the at least one stationary circuit carrier. The at least one circuit carrier can have an additional area occupied by the at least one excitation coil and by the at least one receiving coil of the inductive sensor, corresponding to the path of displacement and an area of the at least one coupling device.

In a further advantageous embodiment of the inductive linear displacement sensor arrangement, two coupling devices can be mounted one behind the other on the two guide elements for displacement of the slider. In this case, a first guide element can guide a first slider of a first coupling device along the displacement path free from backlash, and a second guide element can be used as a sliding guide for the first slider and prevent the first slider from tilting and/or twisting. The second guide member can guide a second slider of a second coupling device along the path of displacement free from backlash, and the first guide member can be used as a sliding guide for the second slider and prevent the second slider from tilting and/or twisting. The movable structure enables independent displacement of the two sliders within certain limits, whereby a completely free displacement is only possible in one opposite direction in each case due to an installation position of the two sliders rotated by 180° relative to each other. However, this limitation can be taken into account in the system design and does not represent a functional limitation with the coupled mechanics. By using two coupling devices, differential detection or determination of the current position of the corresponding moving body is possible.

In a further advantageous embodiment of the inductive linear displacement sensor arrangement, the two sliders of the two coupling devices can each be designed as an L-shaped injection-molded plastic component and arranged nested within one another.

In a further advantageous embodiment of the inductive linear displacement sensor arrangement, the at least one electrically conductive coupling element can be designed as a stamped bent part or as an electrically conductive foil or as an electrically conductive coating or structure. For example, the stamped-bent part can be made of light metal, non-ferrous metal, steel, or stainless steel alloys and attached to the slider by a snap-fit connection or hot caulking. In addition, the at least one electrically conductive coupling element designed as a stamped and bent part can simultaneously mechanically couple a displacement of the body to the slider free from backlash via a continued geometry using a spring-elastic coupling geometry. Alternatively, a small printed circuit board with the electrically conductive structures can be etched. In addition, metal foils can be bonded to the slider of the at least one coupling device as an electrically conductive foil. Alternatively, an electrically conductive coating can be vapor deposited onto the slider of the at least one coupling device.

An exemplary embodiment of the disclosure is shown in the drawings and explained in further detail in the following description. In the drawings, identical reference signs indicate components or elements that perform identical or similar functions.

DETAILED DESCRIPTION

As can be seen from FIGS. 1 through 5, the illustrated exemplary embodiment of an inductive linear displacement sensor arrangement 1 for a vehicle according to the disclosure comprises at least one movable coupling device 10 coupled to a movable body (not shown), which comprises at least one electrically conductive coupling element 12, and a stationary circuit carrier 3. The circuit carrier 3 comprises at least one excitation structure 4 and at least one receiving structure 5 extending along a path of displacement of the at least one coupling device 10, 10A, 10B. An evaluation and control unit 7 evaluates at least one measurement signal induced in the at least one receiving structure 5 and determines the current position of the at least one coupling device 10, 10A, 10B and the movable body. The at least one movable coupling device 10, 10A, 10B comprises a slider 20, 20A, 20B on which the at least one electrically conductive coupling element 12 is arranged. In this case, the slider 20, 20A, 20B is mounted for sliding movement over the path of displacement of the at least one coupling device 10, 10A, 10B on two parallel guide elements 14 in a plane of displacement which extends parallel to the at least one receiving structure 5 of the circuit carrier 3 at a predeterminable constant distance LS. One of the two guide elements 14, 14A, 14B guides the slider 20, 20A, 20B of the at least one coupling device 10, 10A, 10B free from backlash along the path of displacement and another of the two guide elements 14, 14A, 14B is used as a sliding guide and prevents the slider 20, 20A, 20B from tilting and/or twisting.

As can be further seen from FIGS. 1 through 4, the two guide elements 14, 14A, 14B in the illustrated exemplary embodiment of the inductive linear displacement sensor arrangement 1 are each designed as cylindrical guide pins. The guide elements 14, 14A, 14B, designed as cylindrical guide pins, are mounted in parallel in a plastic frame 16, which defines the path of displacement of the at least one coupling device 10, 10A, 10B and supports the circuit carrier 3.

As can be further seen from FIGS. 1 through 5, the inductive linear displacement sensor arrangement 1 in the illustrated exemplary embodiment comprises two coupling devices 10, 10A, 10B, which are mounted one behind the other on the two guide elements 14, 14A, 14B for sliding displacement. In this case, a first guide element 14A guides a first slider 20A of a first coupling device 10A along the displacement path free from backlash, and a second guide element 14B is used as a sliding guide for the first slider 20A and prevents the first slider 20A from tilting and/or twisting. In addition, the second guide member 14B guides a second slider 20B of a second coupling device 10B along the displacement path free from backlash, and the first guide member 14A is used as a sliding guide for the second slider 20B and prevents the second slider 20B from tilting and/or twisting. The two sliders 20, 20A, 20B of the two coupling devices 10, 10A, 10B are each designed as injection-molded plastic components with two guide devices 22, 22A, 22B, which form sliding zones 28, 28A, 28B for the guide elements 14, 14A, 14B. In the illustrated exemplary embodiment, the two sliders 20, 20A, 20B of the two coupling devices 10, 10A, 10B each have an L-shape and are arranged nested within each other. The two sliders 20, 20A, 20B can move independently on the guide elements 14, 14A, 14B.

Figure 4:
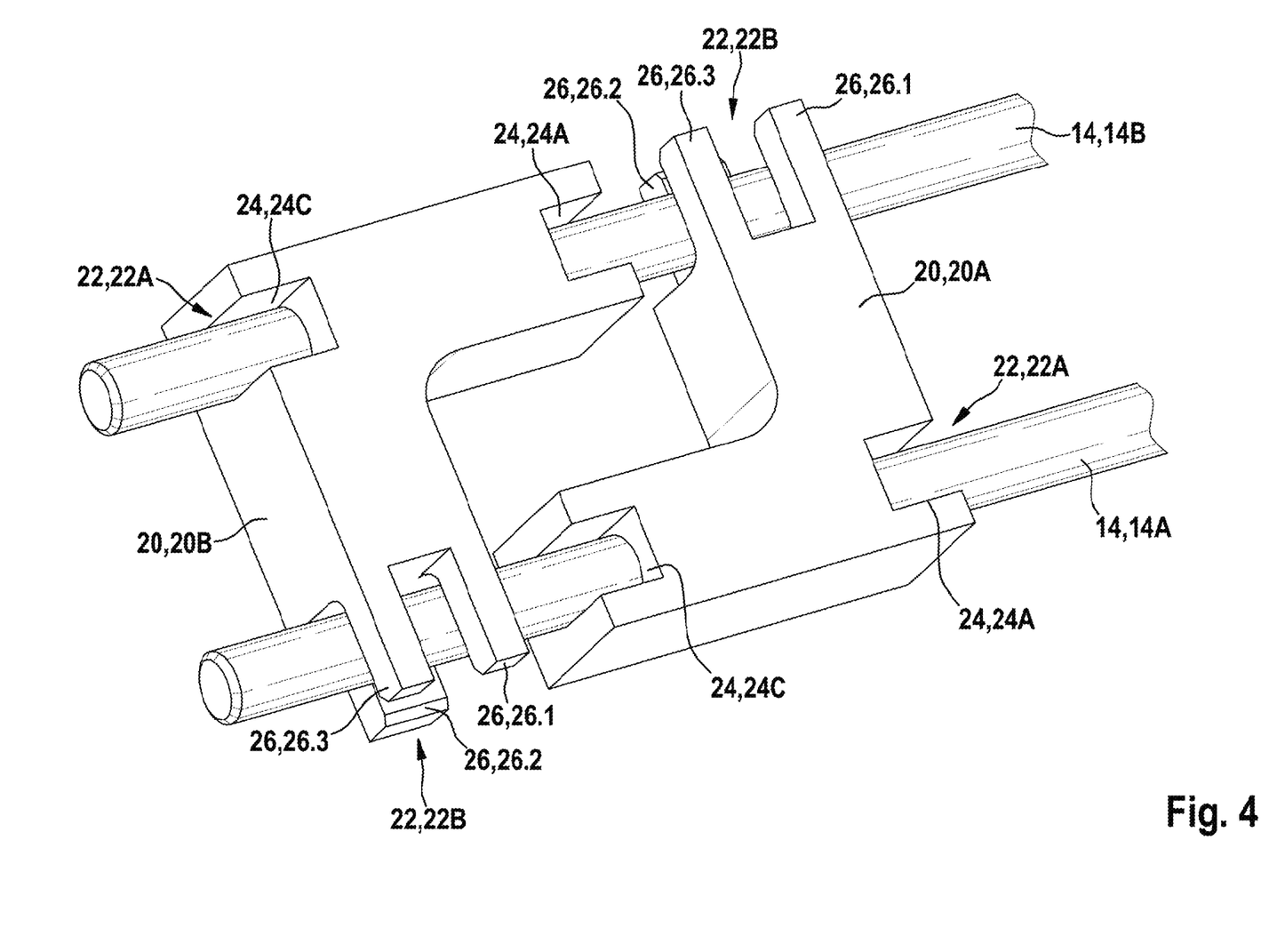
FIG. 4 shows a schematic perspective view of two sliders of the coupling devices of FIG. 3 arranged on two guide elements.
Figure 5:
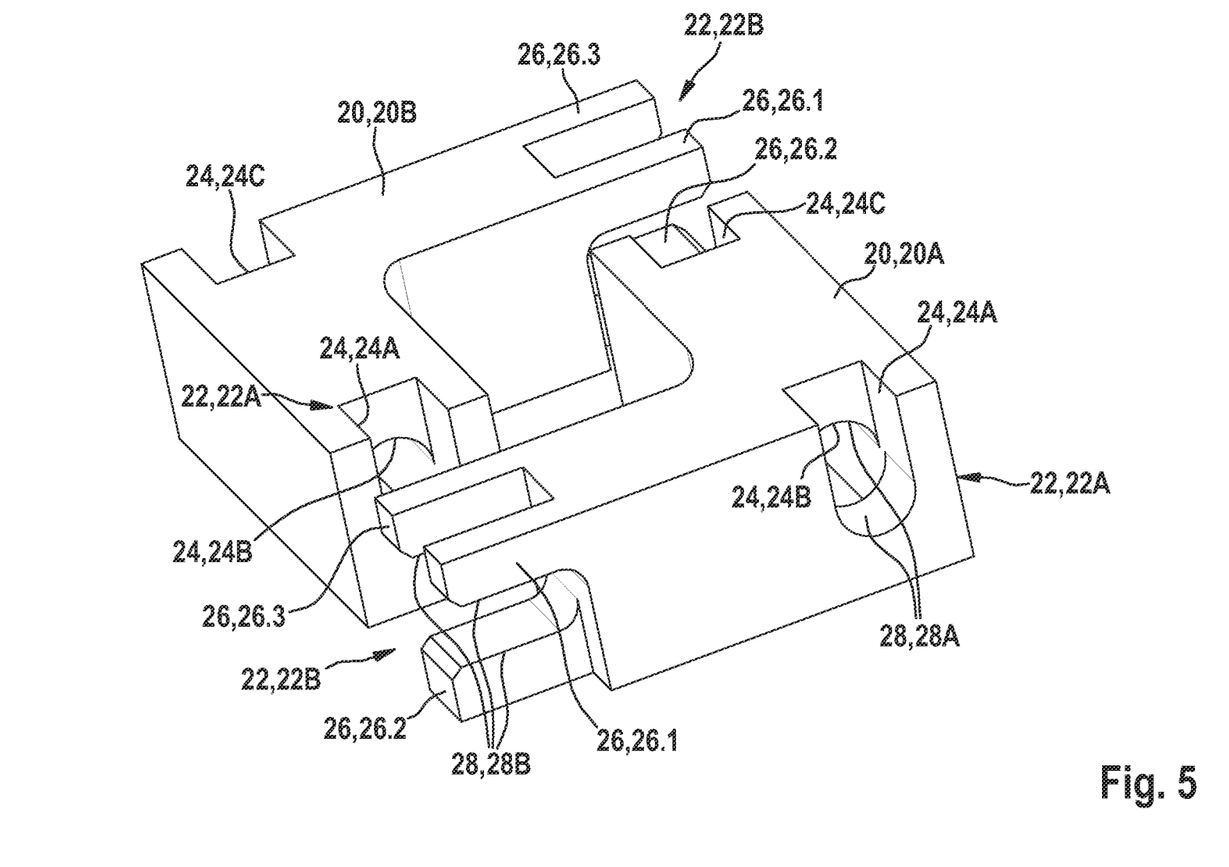
FIG. 5 shows an enlarged perspective view of the sliders of FIG. 4.

As can be further seen in particular from FIGS. 4 and 5, a first guide device 22A of the two sliders 20, 20A, 20B is each designed as a guide opening 24 through which one of the two guide elements 14, 14A, 14B runs free from backlash. A second guide device 22B of each of the two sliders 20, 20A, 20B is designed as a guide fork 26 through which another of the two guide elements 14, 14A, 14B runs. In the illustrated exemplary embodiment, the first guide element 14A runs free from backlash through the guide opening 24 of the first slider 20A and through the guide fork 26 of the second slider 20B. The second guide element 14B runs free from backlash through the guide opening 24 of the second slider 20B and through the guide fork 26 of the first slider 20A. In the illustrated exemplary embodiment, the guide openings 24 of the two sliders 20, 20A, 20B are formed by injection molding by a plurality of U-shaped recesses 24A, 24B, 24C which are formed sequentially on a first leg of the L-shaped sliders 20, 20A, 20B. In this case, adjacent U-shaped recesses 24A, 24B, 24C are rotated 180° relative to each other so that the openings of the U-shaped recesses 24A, 24B, 24C face in opposite directions. The associated connecting regions of the legs of the U-shaped recesses 24A, 24B, 24C are formed as first sliding zones 28A. In the illustrated exemplary embodiment, the guide forks 26 of the two sliders 20, 20A, 20B are formed at the end portion of a second leg of the L-shaped sliders 20, 20A, 20B. In this case, the two guide forks 26 each have three webs 26.1, 26.2, 26.3, which form two plane-parallel surfaces as second sliding zones 28.2. The webs 26.1, 26.2, 26.3 of the guide forks 26 are arranged alternately on opposite sides of the second leg of the L-shaped sliders 20, 20A, 20B. Doing so results in a small running clearance between the guide elements 14, 14A, 14B and the sliders 20, 20A, 20B, so that precise guidance of the sliders 20, 20A, 20B is possible.

Given the described design of the sliders 20, 20A, 20B and guide elements 14, 14A, 14B, the displacement of the electrically conductive coupling elements 12 mounted on the sliders 20, 20A, 20B is only one-dimensional. All other directions of displacement which are caused by, e.g., tilting, twisting, backlash, etc., can be minimized by the dual guidance and opposing support of the sliders 20, 20A, 20B. The movable structure enables independent displacement of the two L-shaped sliders 20, 20A, 20B within certain limits, although the 180° rotated installation position of the two sliders 20, 20A, 20B relative to each other means that completely free displacement is only possible in one opposite direction in each case. The L-shaped design of the sliders 20, 20A, 20B enables a cost-effective design of the plastic injection molded parts, also with regard to low tolerances, which can be manufactured as a tool-bound geometry.

The mechanical fixation of the guide elements 14, 14A, 14B takes place in the frame 16 made of plastic. The plastic materials of the frame 16 and the sliders 20, 20A, 20B are selected so that the sliders 20, 20A, 20B and the frame 16 behave thermally in a similar manner over the required temperature range. The plastic materials used can be adapted in terms of their material properties, so that a small running clearance and thus precise guidance of the sliders 20, 20A, 20B can be produced. The described exemplary embodiment of the slider 20, 20A, 20B is cost-optimized and manufactured as a simple cost-optimized plastic injection-molded part. Given that no slides, etc., are required, the slides 20, 20A, 20B can be produced in molds with multiple cavities. The material pairing between the fixed guide elements 14, 14A, 14B and the sliders 20, 20A, 20B is designed such that, on the one hand, only the smallest forces are required for displacement with low running clearance (e.g. <0.05 mm) and, on the other hand, wear between pins and sliders is also minimized. In the illustrated exemplary embodiment, the material pairing used is POM polymer (POM: PolyOxyMethylene) or PEEK polymer (PEEK: Polyetheretherketone) for the sliders 20, 20A, 20B and the frame 16 in combination with an alloyed stainless steel for the guide elements 14, 14A, 14B.

Figure 2:
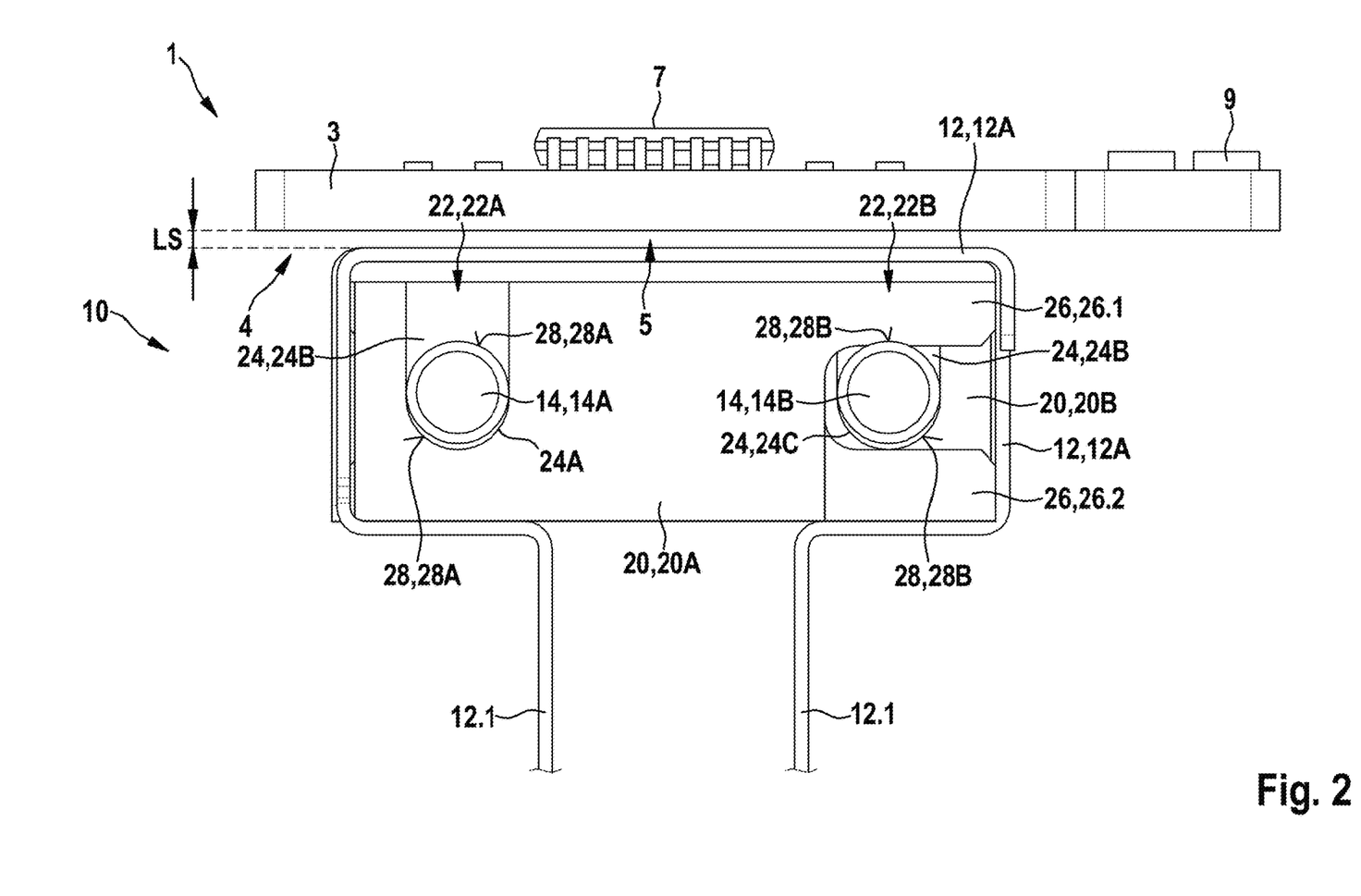
FIG. 2 shows a schematic sectional view of the inductive linear displacement sensor arrangement of FIG. 1 according to the disclosure without plastic frame.
Figure 3:
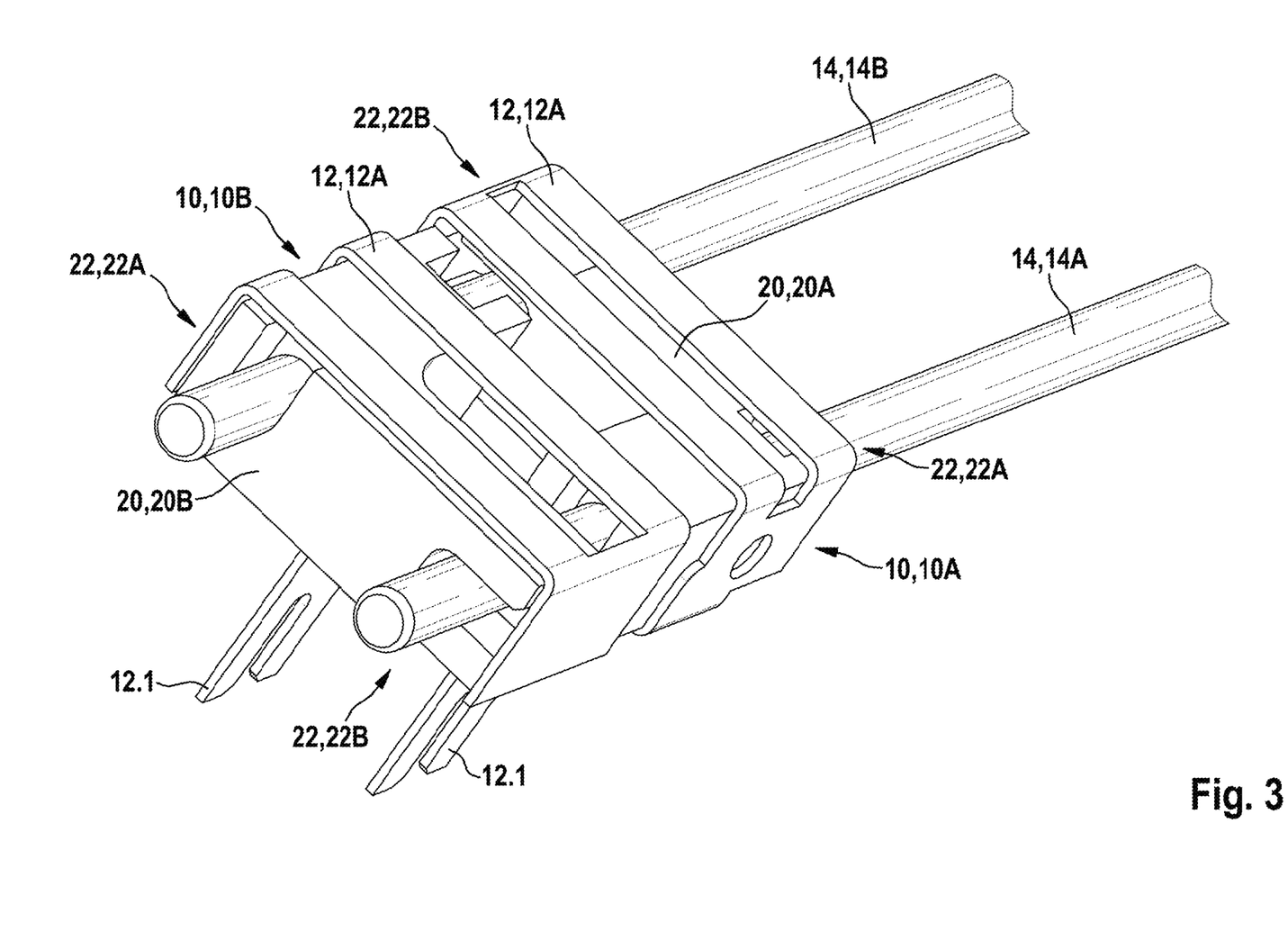
FIG. 3 shows a schematic perspective view of two coupling devices of the inductive linear displacement sensor arrangement according to the disclosure from FIGS. 1 and 2, arranged on two guide elements.

As can be further seen in particular from FIGS. 2 and 3, the at least one electrically conductive coupling element 12 is designed as a stamped and bent part 12A and is attached to the corresponding slider 20, 20A, 20B via hot caulking. Of course, other suitable fastening techniques can also be used. In the illustrated exemplary embodiment, two electrically conductive coupling elements 12 are arranged on each of the two slides 20, 20A, 20B at a distance from each other. The respective stamped and bent part 12A is designed such that drivers 12.1, which mechanically couple the sliders 20, 20A, 20B to the movable body not shown, are each formed as a clamp and can thus perform the function of a backlash-free and positive connection with the mechanical encoder system. The elastic properties of the metal are relevant in this case and determine the shape or dimensions of the clamp. This embodiment of the carrier 12.1 provides sufficient clearance in the contact surface with the mechanical encoder or the moving body in one plane to compensate for tolerances with regard to mechanics, components, assembly and temperature. This clearance is designed such that displacement is only possible in a two-dimensional plane which is perpendicular to the direction of displacement of the sliders 20, 20A, 20B. The mechanical encoder or the moving body can be, e.g., a pedal rod of a brake pedal.

In alternative exemplary embodiments (not shown), the at least one electrically conductive coupling element 12 is implemented as an electrically conductive foil or as an electrically conductive coating or as an electrically conductive structure and is applied directly to the corresponding slider 20, 20A, 20B.

In the illustrated exemplary embodiment, an excitation structure 4 is coupled to an oscillator circuit, (not shown in greater detail), which couples a periodic alternating signal to the excitation structure 4 during operation. The illustrated excitation structure 4 comprises an excitation coil that extends circumferentially along the edge of the at least one circuit carrier 3. The electrically conductive coupling elements 12 of the two sliders 20, 20A, 20B of the two coupling devices 10, 10A, 10B influence an inductive coupling between the excitation structure 4 and the receiving structure 5 depending on their current position and enable a differential detection or determination of the current position of the two coupling devices 10, 10A, 10B of the corresponding moving body. The receiving structure 5 shown comprises a plurality of receiving coils, each of which features a periodically repeating loop structure. The loop structures are distributed over multiple layers of the stationary circuit carrier 3 so that overlaps can be easily avoided. The sections of the repeating loop structures, arranged in different layers, are electrically connected to each other via vias.

Figure 1:
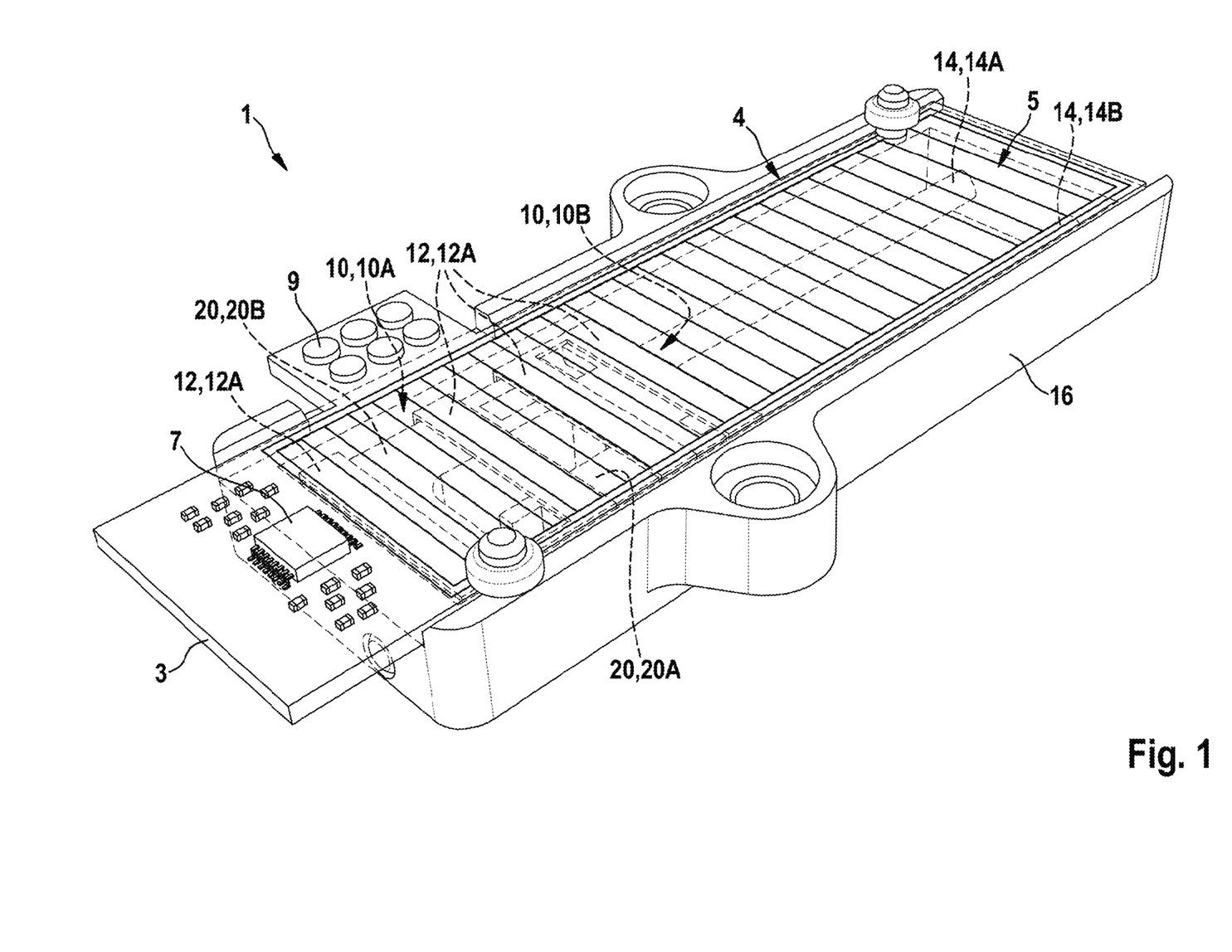
FIG. 1 shows a schematic perspective view of an exemplary embodiment of an inductive linear displacement sensor arrangement for a vehicle according to the disclosure with a circuit carrier shown in transparent form.

As can be further seen in particular from FIGS. 1 and 2, the circuit carrier 3 comprises a first section arranged at the edge of the frame 16, in which the evaluation and control unit 7 is arranged, which is designed as an ASIC module, and a laterally arranged second section, on which electrical contact points 9 are arranged for contacting the inductive linear displacement sensor arrangement 1. In addition, the circuit carrier 3 comprises a third section inserted in the frame 16, on which the excitation coil of the excitation structure 14 and the reception coils of the receiving structure 5 are arranged. The surface extent of the third section of the circuit carrier 5 is adapted to the path of displacement of the sliders 20, 20A, 20B and the surfaces of the two coupling devices 10, 10A, 10B determined by the frame 3.

The invention claimed is:

1. An inductive linear displacement sensor arrangement for a vehicle, comprising:
    a first movable coupling device coupled to a movable body and including a first slider on which at least one first electrically conductive coupling element is arranged;
    a second movable coupling device coupled to the movable body and including a second slider on which at least one second electrically conductive coupling element is arranged; and
    a stationary circuit carrier including at least one excitation structure and at least one receiving structure each extending along a displacement path of the first movable coupling device and the second movable coupling device, the stationary circuit carrier further including an evaluation and control unit configured to (i) evaluate at least one measurement signal induced in the at least one receiving structure, and (ii) to determine a current position of the first movable coupling device and the second movable coupling device along the displacement path,
    wherein the first slider and the second slider are mounted on two parallel guide elements, such that the first slider and the second slider each slide in a plane of displacement extending parallel to the at least one receiving structure at a predeterminable constant distance from the at least one receiving structure,
    wherein a first guide opening defined by the first slider receives a first guide element of the two parallel guide elements, such that the first slider is guided with minimized backlash along the displacement path,
    wherein a second guide opening defined by the second slider receives a second guide element of the two parallel guide elements, such that the second slider is guided with minimized backlash along the displacement path,
    wherein a first guide fork of the first slider is configured to receive the second guide element to prevent the first slider from tilting and/or twisting relative to the two parallel guide elements,
    wherein a second guide fork of the second slider is configured to receive the first guide element to prevent the second slider from tilting and/or twisting relative to the two parallel guide elements, and
    wherein the first slider and the second slider are each configured as L-shaped components and are arranged nested within one another.

2. The inductive linear displacement sensor arrangement according to claim 1, wherein the two parallel guide elements are each configured as cylindrical guide pins.

3. The inductive linear displacement sensor arrangement according to claim 1, wherein:
    the two parallel guide elements are mounted in parallel in a plastic frame, and
    the plastic frame defines the displacement path and supports the stationary circuit carrier.

4. The inductive linear displacement sensor arrangement according to claim 1, wherein the first slider and the second slider are configured as plastic injection-molded components.

5. The inductive linear displacement sensor arrangement according to claim 1, wherein the first slider is configured to be coupled to the movable body by at least one driver of the at least one first electrically conductive coupling element.

6. The inductive linear displacement sensor arrangement according to claim 1, wherein:
    the at least one excitation structure is coupled to at least one oscillator circuit configured to couple a periodic alternating signal into the at least one excitation structure; and
    the first movable coupling device and the second movable coupling device are configured to influence an inductive coupling between the at least one excitation structure and the at least one receiving structure as a function of the current position of the first movable coupling device and the second movable coupling device.

7. The inductive linear displacement sensor arrangement according to claim 1, wherein the at least one excitation structure comprises at least one excitation coil configured to run circumferentially on an edge of the stationary circuit carrier.

8. The inductive linear displacement sensor arrangement according to claim 1, wherein the at least one receiving structure comprises at least one receiving coil.

9. The inductive linear displacement sensor arrangement according to claim 8, wherein the at least one receiving coil comprises a periodically repeating loop structure distributed over a plurality of layers of the stationary circuit carrier.

10. The inductive linear displacement sensor arrangement according to claim 1, wherein:
    the first movable coupling device and the second movable coupling device are mounted, one behind the other, on the two parallel guide elements, such that the first movable coupling device and the second movable coupling device are each configured to slide in the plane of displacement.

11. The inductive linear displacement sensor arrangement according to claim 1, wherein the at least one first electrically conductive coupling element is configured as one of a stamped bent part, an electrically conductive foil, an electrically conductive coating, and an electrically conductive structure.

* * * * *